United States Patent
Bitny et al.

(10) Patent No.: US 11,741,626 B2
(45) Date of Patent: *Aug. 29, 2023

(54) SURFACE PROJECTION DETERMINATION OF A MULTIDIMENSIONAL OBJECT IN A VIEWPORT SPACE

(71) Applicant: Trivver, Inc., Huntington Beach, CA (US)

(72) Inventors: Igor Bitny, Newport Beach, CA (US); Sergey Kondratov, Krasnoyarsk (RU)

(73) Assignee: Trivver, Inc., Merritt Island, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/148,800

(22) Filed: Jan. 14, 2021

(65) Prior Publication Data

US 2021/0166414 A1 Jun. 3, 2021

Related U.S. Application Data

(63) Continuation of application No. 16/262,881, filed on Jan. 30, 2019, now Pat. No. 10,949,990.

(51) Int. Cl.
*G06T 7/62* (2017.01)
*G01B 11/25* (2006.01)
*G01B 11/03* (2006.01)

(52) U.S. Cl.
CPC .............. *G06T 7/62* (2017.01); *G01B 11/03* (2013.01); *G01B 11/2513* (2013.01)

(58) Field of Classification Search
CPC ... G06T 7/62; G06T 15/20; G06T 15/40; G01B 11/03; G01B 11/2513
USPC .......................................................... 382/100
See application file for complete search history.

(56) References Cited

U.S. PATENT DOCUMENTS

| 10,209,877 B2* | 2/2019 | Bernstein .............. G06F 3/0486 |
| 2002/0050988 A1* | 5/2002 | Petrov .................... G06V 10/10 345/418 |
| 2016/0027200 A1* | 1/2016 | Corazza .................. G06T 15/04 345/420 |
| 2019/0197711 A1* | 6/2019 | Macrae ..................... G06T 7/70 |
| 2019/0221034 A1* | 7/2019 | Mason .................... G06T 15/08 |
| 2021/0205704 A1 | 7/2021 | Badichi |
| 2022/0118359 A1 | 4/2022 | Badichi |

* cited by examiner

*Primary Examiner* — Ali Bayat
(74) *Attorney, Agent, or Firm* — CHHABRA LAW FIRM, PC

(57) ABSTRACT

Using various embodiments, systems, methods and techniques to determine whether a surface of the multidimensional object is projected on a camera on a viewport space displayed on a graphical user interface. This includes projecting a first vector normal to a surface of the multidimensional object, where the multidimensional object is rendered in an electronically generated multidimensional environment, projecting a second vector from the camera to the surface of the multidimensional object, determining an angle between the first vector and the second vector, and based on the angle determining whether the surface is projected on the viewport space.

20 Claims, 10 Drawing Sheets

```
┌─────────────────────────────────────────────────────────────────┐
│ Determine, by a computer system, a set of visible faces         │
│ projected by a camera on a viewport space displayed on a        │
│ graphical user interface, wherein the multidimensional object   │
│ is presented in an electronically generated multidimensional    │
│ environment                                                     │
│                            602                                  │
└─────────────────────────────────────────────────────────────────┘
                               │
                               ▼
┌─────────────────────────────────────────────────────────────────┐
│ Project vertices of each face in the set of visible faces that  │
│ are visible on the viewport space                               │
│                            604                                  │
└─────────────────────────────────────────────────────────────────┘
                               │
                               ▼
┌─────────────────────────────────────────────────────────────────┐
│ Determine a set of polygons of each face based on the projected │
│ vertices of each face                                           │
│                            606                                  │
└─────────────────────────────────────────────────────────────────┘
                               │
                               ▼
┌─────────────────────────────────────────────────────────────────┐
│ Calculate an area of each polygon in the set of polygons        │
│                            608                                  │
└─────────────────────────────────────────────────────────────────┘
                               │
                               ▼
┌─────────────────────────────────────────────────────────────────┐
│ Perform a summation of the area of each polygon in the set of   │
│ polygons.                                                       │
│                            610                                  │
└─────────────────────────────────────────────────────────────────┘
```

Determine a view projection matrix, wherein view represents mapping of world space coordinates to camera space coordinates, and wherein projection represents mapping the camera space coordinates to viewport space coordinates

802

Derive homogenous coordinates of each vertex of the face

804

Multiply the view projection matrix with the homogenous coordinates.

Determine whether a vertex out of the projected vertices of a face is projected inside or outside the viewport space
902

Determine a total number of vertices of the face projected inside the viewport space
904

When it is determined that a polygon cannot be drawn from the vertices projected inside the viewport space, setting the area of the polygon to zero.
906

SURFACE PROJECTION DETERMINATION OF A MULTIDIMENSIONAL OBJECT IN A VIEWPORT SPACE

CROSS REFERENCE TO RELATED APPLICATIONS

The present application is a continuation of, and claims priority from, co-pending U.S. patent application Ser. No. 16/262,881, titled "GEOMETRIC AREA OF PROJECTION OF A MULTIDIMENSIONAL OBJECT IN A MULTIDIMENSIONAL ENVIRONMENT" filed on Jan. 30, 3019. The contents of the above identified application is incorporated herein by reference for all purposes to the extent that such subject matter is not inconsistent herewith.

FIELD OF THE INVENTION

Embodiments of the present invention relates generally to projective geometry in an electronically (e.g., computer) generated multidimensional environment. More particularly, embodiments of the invention relate to determining whether a surface of an object is displayed in an electronically generated multidimensional environment.

BACKGROUND OF THE INVENTION

Multi-dimensional computer generated or simulated environments are utilized in many different fields that use computer aided visualization techniques. These techniques require calculation of a geometric area of projection (GAP), to determine the area a virtual object projects in a viewport space.

However, currently known techniques are inefficient or inaccurately determine the geometric area of projection of an object. Therefore, what is needed are systems, methods, and techniques that can overcome the above identified limitations and efficiently to assist in determining a GAP of a multidimensional digital object within the multidimensional environment.

BRIEF DESCRIPTION OF THE DRAWINGS

The present invention is illustrated by way of example and not limitation in the figures of the accompanying drawings in which like references indicate similar elements.

FIG. 6 illustrates flow diagram 600 describing the operations to determine a geometrical area of projection of a multidimensional object, according to one embodiment of the invention.

FIG. 8 illustrates flow diagram 800 describing the operations to project the vertices of a face to the viewport space, according to one embodiment of the invention.

FIG. 9 illustrates flow diagram 900 describing the operations to determine a geometrical area of projection of a face of a multidimensional object based on the location of a projected vertex of the face, according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

The techniques presented herein efficiently determine whether a surface of the multidimensional object is projected on a camera on a viewport space displayed on a graphical user interface. These techniques can be used, for example, to determine a geometric area of projection of an object.

A geometrical area of projection (GAP) is total area projected by the vertices of a multidimensional virtual object, in a normalized coordinate system, visible on the viewport (normalized viewport space). When the rendering device includes a conventional graphical interface (e.g., screen) the normalized coordinate system can be represented as a two dimensional coordinate system.

Although exemplary embodiments are explained in a screen coordinate system, the scope of the invention is not intended to be limited to conventional rendering devices (e.g., screens), but can include multidimensional rendering devices, including interfaces required for virtual and augmented reality systems.

Figure 1:
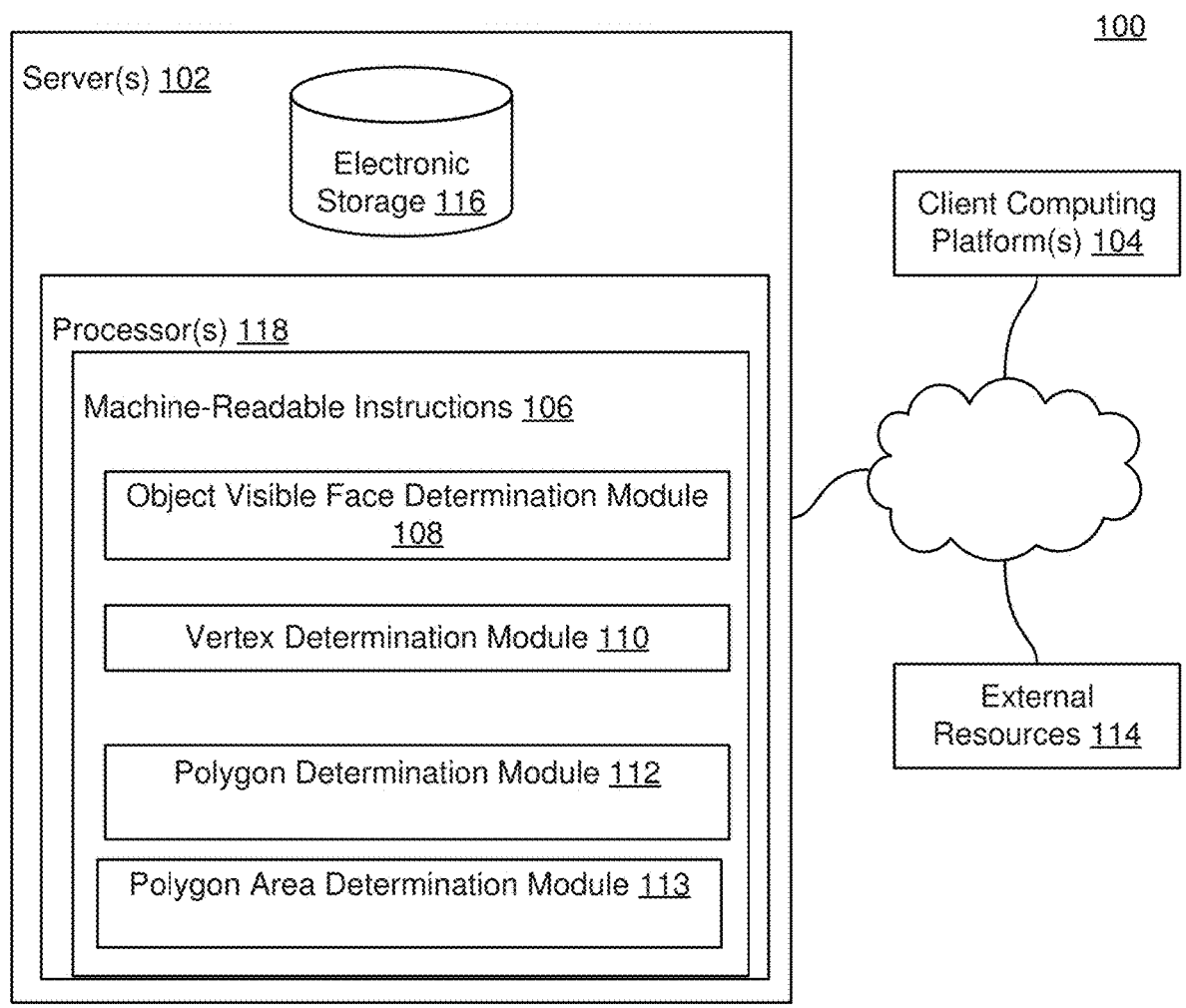
FIG. 1 illustrates a system 100 configured to determine a geometrical area of projection of a multidimensional object displayed on graphical user interface, according to one embodiment of the invention.

FIG. 1 illustrates a system 100 configured to determine a geometrical area of projection of a multidimensional object displayed on graphical user interface, according to one embodiment of the invention.

In some embodiments, system 100 can include one or more servers 102. Server(s) 102 can be configured to communicate with one or more client computing platforms 104 according to a client/server architecture and/or other architectures. Client computing platform(s) 104 can be configured to communicate with other client computing platforms via server(s) 102 and/or according to a peer-to-peer architecture and/or other architectures. Users can access system 100 via client computing platform(s) 104.

System 100 can, generally, be used to determine a geometrical area of projection of a multidimensional object. Server(s) 102 can be configured by machine-readable instructions 106. Machine-readable instructions 106 can include one or more instruction modules. The instruction modules can include computer program modules. The instruction modules can include one or more of a object visible face determination module 108, a vertex determination module 110, and a Polygon determination module 112, polygon area determination module 113, and/or other instruction modules.

In one embodiment, object visible face determination module 108 can be configured to determine a set of visible faces of the multidimensional object, projected by a camera on a viewport space displayed on a graphical user interface. The multidimensional object can be presented to a user in an electronically generated multidimensional environment.

Vertex determination module 110 can be configured to determine the vertices, in the coordinate system used by the viewport space, of each visible face of the multidimensional object. In one embodiment, module 110 can include instructions to project vertices of each face of the multidimensional object that are visible on the viewport space.

Polygon determination module 112 can be configured to determine the features of each face by determining a number of polygons that can be drawn/projected by the vertices of each face. Module 112 can include instructions to determine polygons (e.g., quadrilateral, square, triangle, etc.) from the projected vertices.

Polygon area determination module 113 can be configured to determine an area of each polygon. Thereafter module 113 can perform a summation of all the areas calculated to determine the GAP of the multidimensional object. In one embodiment, the GAP provides an estimate of the hypothetical screen area for the multidimensional object's projection on the viewport. The GAP determines a ratio of the multidimensional object projection area to the viewport area:

$$GAP = \frac{\text{Total Area of Projection of Multidimensional Object}}{\text{Total Area of Viewport}}$$

In some embodiments, server(s) 102, client computing platform(s) 104, and/or external resources 114 can be operatively linked via one or more electronic communication links. For example, such electronic communication links can be established, at least in part, via a network such as the Internet and/or other networks. It will be appreciated that this is not intended to be limiting, and that the scope of this disclosure includes embodiments in which server(s) 102, client computing platform(s) 104, and/or external resources 114 can be operatively linked via some other communication media.

A given client computing platform 104 can include one or more processors configured to execute computer program modules. The computer program modules can be configured to enable an expert or user associated with the given client computing platform 104 to interface with system 100 and/or external resources 114, and/or provide other functionality attributed herein to client computing platform(s) 104. By way of non-limiting example, the given client computing platform 104 can include one or more of a desktop computer, a laptop computer, a handheld computer, a tablet computing platform, a NetBook, a Smartphone, a gaming console, and/or other computing platforms. External resources 114 can include sources of information outside of system 100, external entities participating with system 100, and/or other resources. In some embodiments, some or all of the functionality attributed herein to external resources 114 can be provided by resources included in system 100.

Server(s) 102 can include electronic storage 116, one or more processors 118, and/or other components. Server(s) 102 can include communication lines, or ports to enable the exchange of information with a network and/or other computing platforms. Illustration of server(s) 102 in FIG. 1 is not intended to be limiting. Server(s) 102 can include a plurality of hardware, software, and/or firmware components operating together to provide the functionality attributed herein to server(s) 102. For example, server(s) 102 can be implemented by a cloud of computing platforms operating together as server(s) 102.

Electronic storage 116 can comprise non-transitory storage media that electronically stores information. The electronic storage media of electronic storage 116 can include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 can include one or more virtual storage resources (e.g., cloud storage, a virtual private network, and/or other virtual storage resources). Electronic storage 116 can store software algorithms, information determined by processor(s) 118, information received from server(s) 102, information received from client computing platform(s) 104, and/or other information that enables server(s) 102 to function as described herein.

Processor(s) 118 can be configured to provide information processing capabilities in server(s) 102. As such, processor(s) 118 can include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some embodiments, processor(s) 118 can include a plurality of processing units. These processing units can be physically located within the same device, or processor(s) 118 can represent processing functionality of a plurality of devices operating in coordination. Processor(s) 118 can be configured to execute modules 108, 110, 112, and/or other modules.

Processor(s) 118 can be configured to execute modules 108, 110, 112, and/or other modules by software; hardware; firmware; some combination of software, hardware, and/or firmware; and/or other mechanisms for configuring processing capabilities on processor(s) 118. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although modules 108, 110, 112, and/or 113 are illustrated in FIG. 1 as being implemented within a single processing unit, in embodiments in which processor(s) 118 includes multiple processing units, one or more of modules 108, 110, and/or 112 can be implemented remotely from the other modules. The description of the functionality provided by the different modules 108, 110, 112, and/or 113 described below is for illustrative purposes, and is not intended to be limiting, as any of modules 108, 110, 112, and/or 113, can provide more or less functionality than is described. For example, one or more of modules 108, 110, 112, and/or 113 can be eliminated, and some or all of its functionality can be provided by other ones of modules 108, 110, 112, and/or 113. As another example, processor(s) 118 can be configured to execute one or more additional modules that can perform some or all of the functionality attributed below to one of modules 108, 110, 112, and/or 113.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Figure 2:
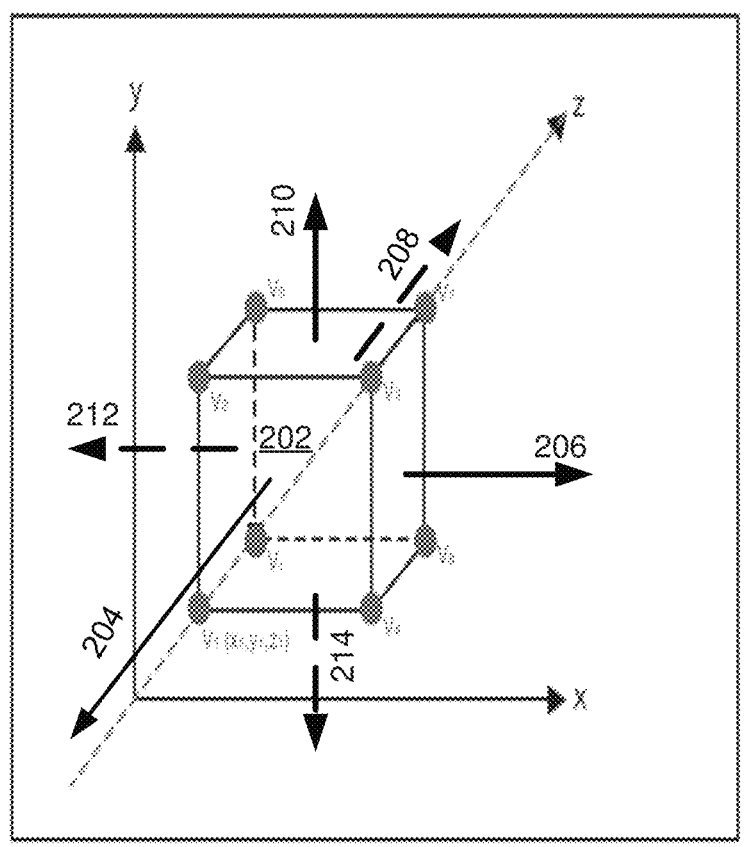
FIG. 2 illustrates diagram 200 describing a multidimensional object in a multidimensional space whose geometrical area of projection needs to be determined, according to one embodiment of the invention.

FIG. 2 illustrates diagram 200 describing a multidimensional object in a multidimensional space whose geometrical area of projection needs to be determined, according to one embodiment of the invention. As illustrated, multidimensional object 202 is a 3D object in an Euclidean space having points $V_1$ through $V_8$. Face determination module 108, in one embodiment, determines whether a face of multidimensional object 202 is visible on the viewport space by projecting a vector normal to each face of the multidimensional object. As illustrated vectors 204-214 each represent a normal vector to each respective face/surface of multidimensional object. In this illustration, dashed vectors 208, 212, and 214 indicate that they are not visible from the camera. The vectors can be projected from each outside surface of multidimensional object 202, thus vector 208, from the back face of multidimensional object 202, is projected further away from the camera. Thereafter, another (second) vector (not shown) from the camera to each face is projected. The second vector can be drawn/projected towards the center of each face from the camera. In another embodiment, the second vector from the camera is drawn/projected towards a median point of the face of multidimensional object 202. In yet another embodiment, the second vector can be projected from the face of multidimensional object 202 towards the camera.

After both vectors are projected on each face, an angle between the first vector and the second vector are determined. In one embodiment, the angle can be determined by a dot product between the first vector and the second vector. In one embodiment, the face is determined to be visible in the viewport space when the angle between the first vector and the second vector is less than ±90 degrees (plus or minus 90 degrees). When the angle is exactly ±90 degrees then only an edge/corner of the face is visible. When the angle is more than ±90 degrees then the face of the multidimensional object is considered to be not visible. After the visible faces projected on the viewport space are determined, the vertices (in the viewport space coordinate system) of each of the visible face can be determined as illustrated in FIG. 3.

Figure 3:
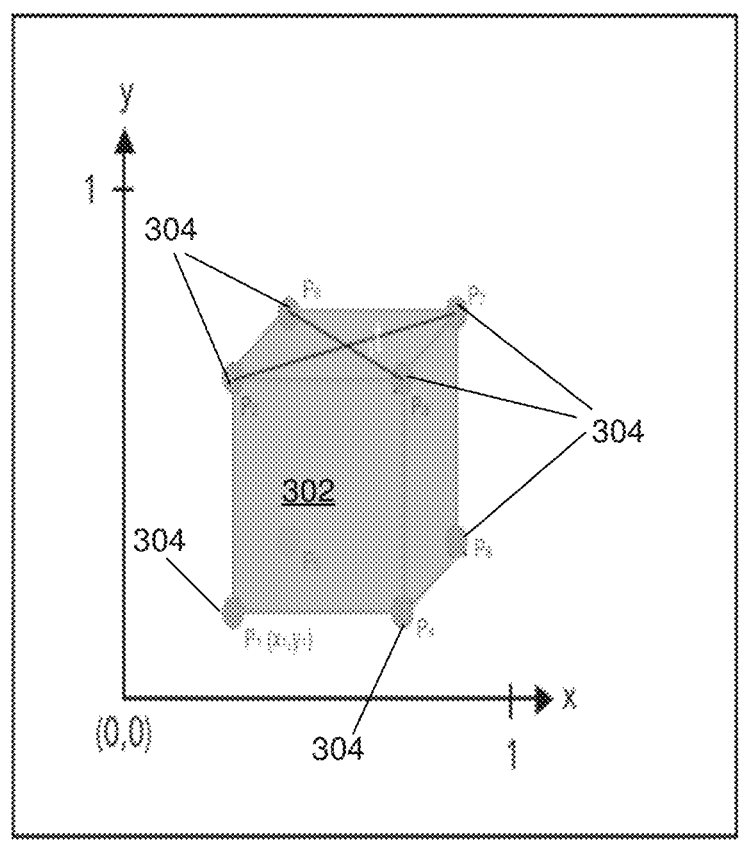
FIG. 3 illustrates diagram 300 describing the geometrical area of projection of a multidimensional object on a normalized coordinate of the viewport of a multidimensional environment, according to one embodiment of the invention.

FIG. 3 illustrates diagram 300 describing the geometrical area of projection of a multidimensional object on a normalized coordinate of the viewport of a multidimensional environment, according to one embodiment of the invention. Once the visible faces are determined the vertices can be projected on the viewport space. This includes determining a view projection matrix, where view represents mapping of world space coordinates to camera space coordinates, and projection represents mapping the camera space coordinates to viewport space coordinates. It is presumed that a mapping of the local multidimensional coordinate space (e.g., three dimensional coordinate system) of the each face into world space coordinates (model matrix) has already been performed. If not, a model view projection matrix is determined instead of a view projection matrix.

Thereafter, homogenous coordinates of each point of the face of the multidimensional object can be derived. In order to derive the homogenous coordinates, the point coordinates are projected with a scaling factor for the projection. For example, for a three dimensional object having point $P_{xyz}$ (that is a point having a x, y, and z dimensions), the homogenous coordinates can be determined as $P_{x,y,z,w}$, where w represents the scaling factor. When the viewport space is presented on a conventional screen having a normalized coordinate system, w is set to 1. Therefore, in this example, the homogenous coordinate of point $P_{xyz}$ in a three dimensional space can be represented as: $P_{xyz1}$ The projected vertices of each face can then be derived by multiplying the view projection matrix, or model view projection matrix (as the case may be), with the homogenous coordinates. In a three dimensional space this can be represented as:

Vertex$_{viewspace}$=Matrix$_{viewprojection}$×$P_{3Dspace}$, where
$P_{3Dspace}$ is homogeneous coordinates of
$P=(x,y,z,1)$.

In one embodiment, the view projection matrix of the rendering pipeline of the graphics engine generating the multidimensional environment (e.g., 3D engine) can be used. The view projection matrix relies on position/rotation of the camera, field of view, screen aspect ratio, and the camera's far and near clip planes. Therefore, a person of ordinary skill in the art would appreciate that the generation of the view projection matrix may vary from one implementation to another.

Figure 4:
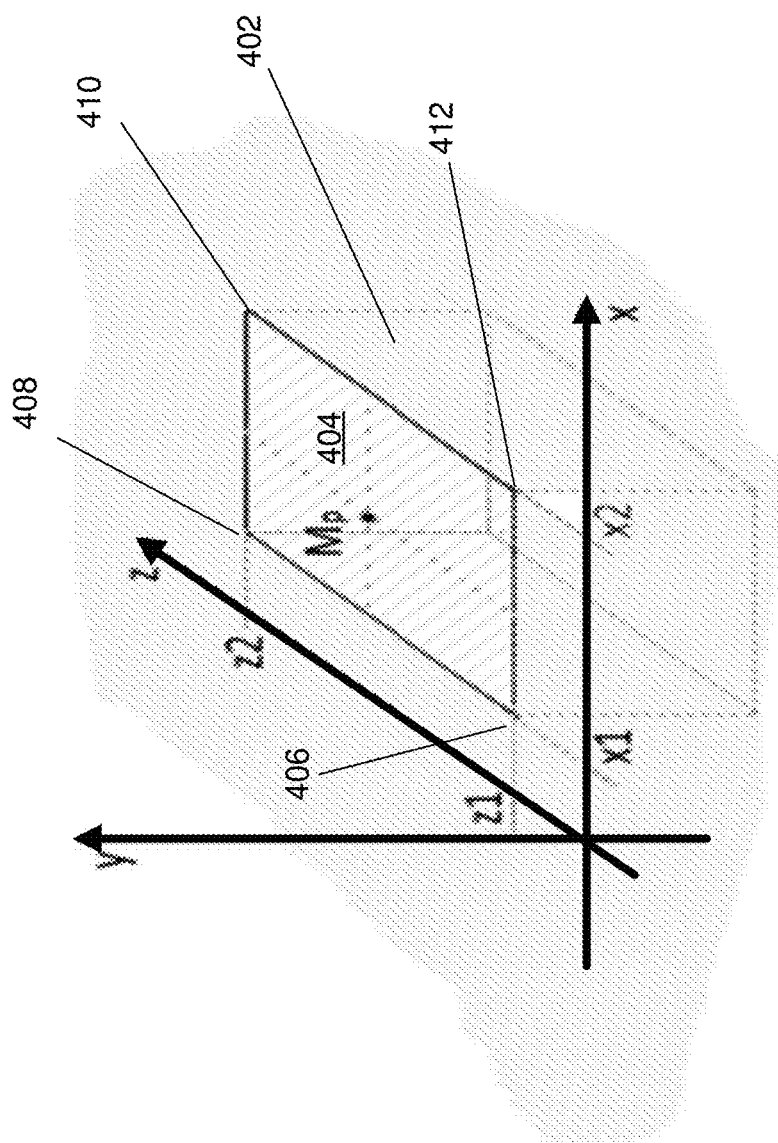
FIG. 4 illustrates diagram 400 describing a multidimensional object in order to determine the median point of a faces of the object, according to one embodiment of the present invention.

FIG. 4 illustrates diagram 400 describing a multidimensional object in order to determine the median point of a faces of the object, according to one embodiment of the present invention. In order to determine the visible faces, as described above, in one embodiment, the vector from the camera to face is determined at the face's median point. In one embodiment, in order to determine the median point of, or an approximation thereof, multidimensional object 202 is encapsulated within a bounding box 402, as illustrated. A face 404 of the bounding box can be selected to determine its median point. As illustrated, face 404 is a plane on the y axis in a Euclidean space (thus has the same y-dimension) with vertex 406 ($x_1,y,z_1$), vertex 408 ($x_1,y,z_2$), vertex 410 ($x_2,y,z_2$) and vertex 412 ($x_2,y,z_1$). Face 404 illustrates a parallelogram and is currently visible to the camera. The median point ($M_p$) is then calculated in the face's coordinate system (model coordinate system) as the sum of all the vertex coordinates divided by 4, and is represented as:

$$M_p = \frac{\text{Vertex 406 } coord.+\text{Vertex 408 } coord.+\text{Vertex 410 } coord.+\text{Vertex 412 } coord.}{4}$$

Once the median point is determined, in one embodiment, the second vector can be drawn/projected from the point to the camera (or vice-versa) to determine whether a face is visible as described above.

Figure 5:
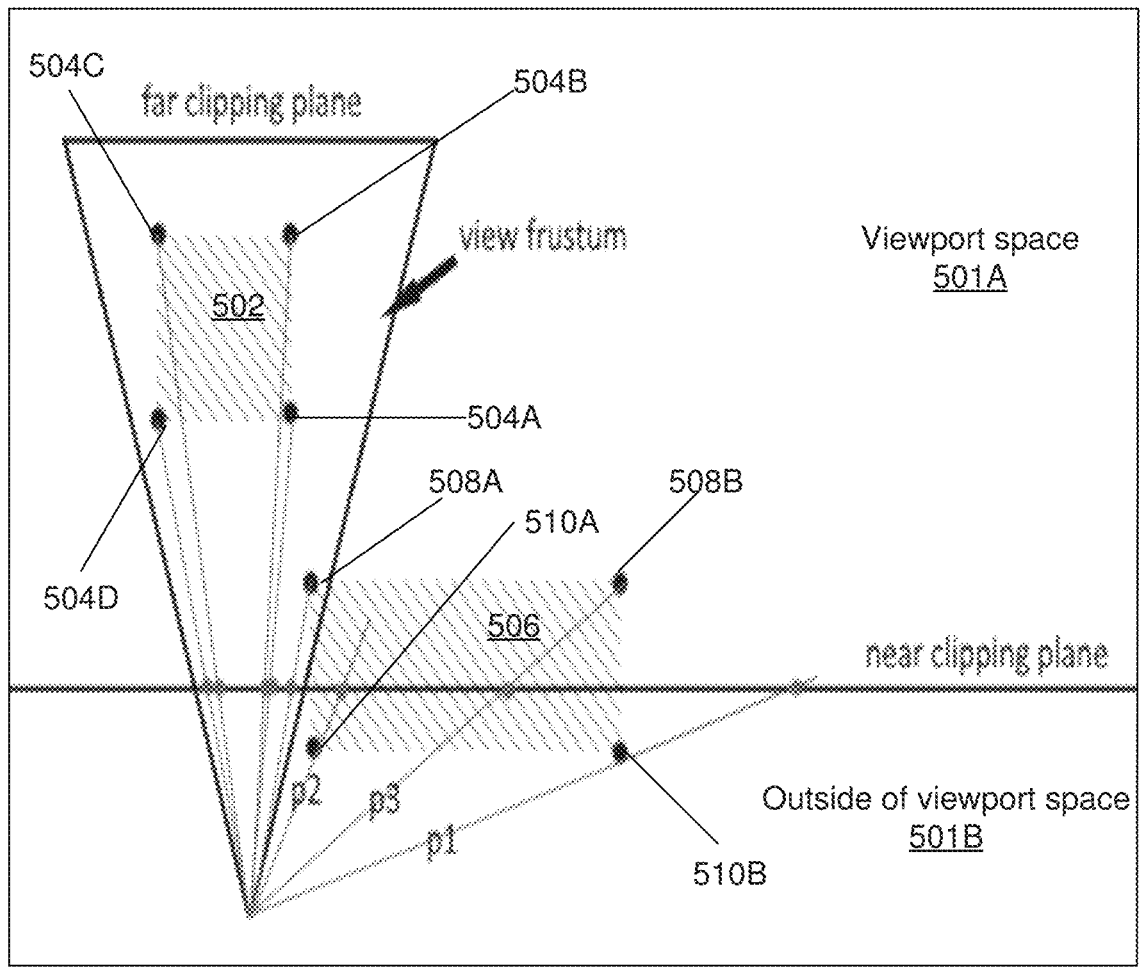
FIG. 5 illustrates diagram 500 describing the process in determining candidate vertices of a multidimensional object that can be used to determine the geographical area of projection, according to one embodiment of the invention.

FIG. 5 illustrates diagram 500 describing the process in determining candidate vertices of a multidimensional object that can be used to determine the GAP, according to one embodiment of the invention. As illustrated, vertices can be projected inside viewport space 501A or outside of it (represented as 501B). The vertices of two objects are projected with face 502 and face 506 respectively. All the vertices of face 502 are projected within viewport space 501A and are represented as 504A-D. However, vertex 508A and 508B of face 506 are projected within viewport space 501A while vertex 510A and 510B are projected at outside space 501B.

In one embodiment, to determine whether a vertex of a face can be used to determine the GAP of multidimensional object 202, a total number of vertices of face projected inside the viewport space is determined. As illustrated for face 506, vertices 510A and 510B are projected at outside of the viewport space (at 501B), and 508A and 508B are projected within viewport space 501A. Thereafter, it is determined whether a polygon can be drawn with the vertices projected within viewport space. Since a polygon can be drawn with vertices 504A-D, those vertices are considered as candidate vertices to determine the area of face 502, and thus the area of face 502 is used in determining the GAP of the object corresponding to face 502.

However, as illustrated, with two vertices only (508A and 508B) a polygon cannot be drawn for face 506. Thus, the area of face 506 is set to zero and face 506 is not considered for determining the GAP of the corresponding object. In another example, if 510B can be projected within viewport space 501A, three vertices of face 506 (vertex 508A, 508B, and 510B) can be used to project a triangle. Thus, in such a case, the area of face 506 can be determined with the area of a triangle comprising the three vertices.

FIG. 6 illustrates flow diagram 600 describing the operations to determine a geometrical area of projection of a multidimensional object, according to one embodiment of the invention. As illustrated at operation 602, a set of visible faces projected by a camera on a viewport space displayed on a graphical user interface is determined, where the multidimensional object is presented in an electronically generated multidimensional environment. Thereafter at operation 604, the vertices of each face in a set of visible faces that are visible on the viewport space are projected. A set of polygons of each face based on the projected vertices of each face is determined at operation 606. Then, an area of each polygon in the set of polygons is calculated, as illustrated at 608. A summation is performed of each area in the set of polygons to determine the GAP of the multidimensional object as illustrated at 610.

Figure 7:
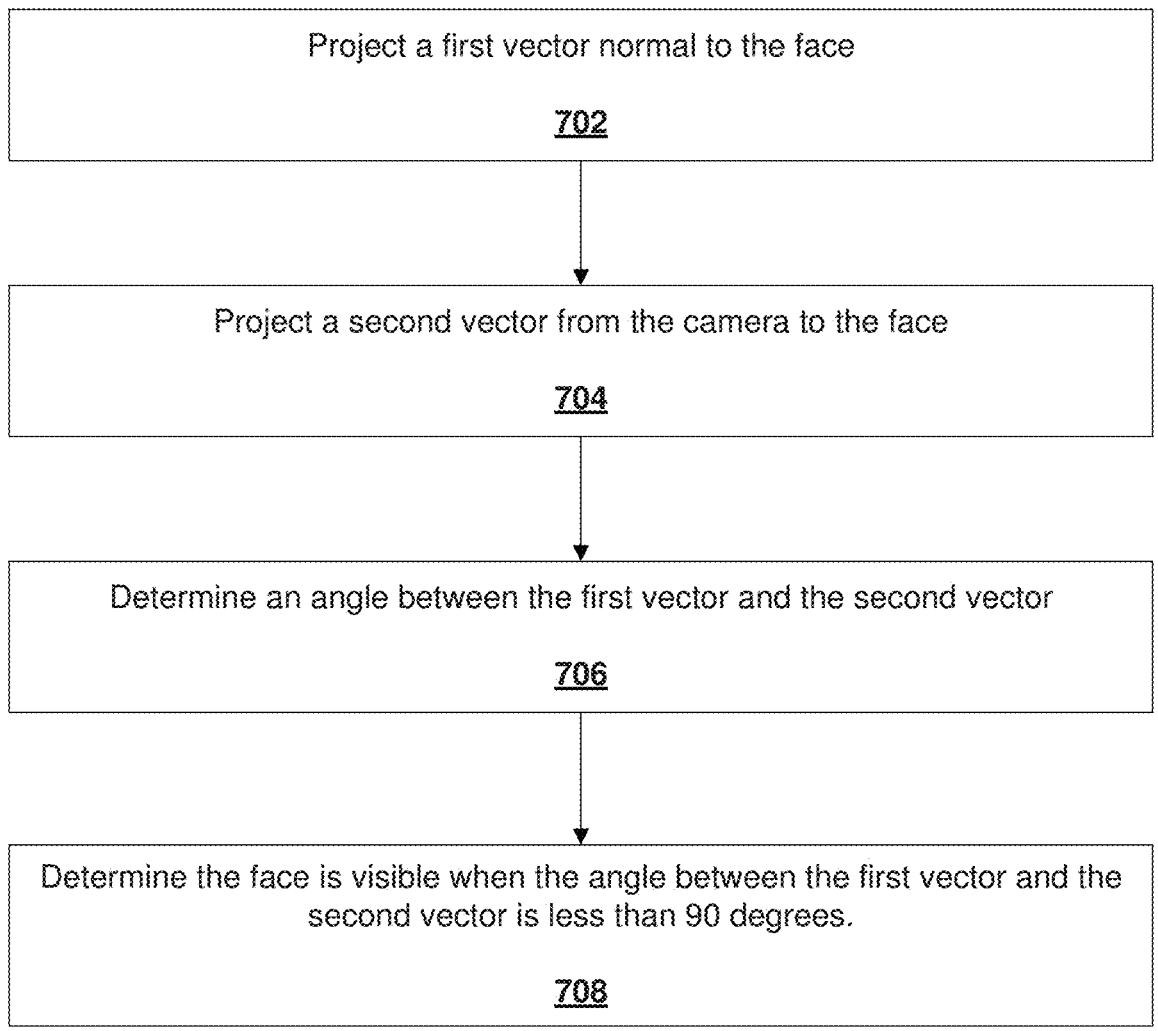
FIG. 7 illustrates flow diagram 700 describing the operations to determining whether a face of the multidimensional object is included in the set of visible faces projected on the viewport space, according to one embodiment of the invention.

FIG. 7 illustrates flow diagram 700 describing the operations to determining whether a face of the multidimensional object is included in the set of visible faces projected on the viewport space, according to one embodiment of the invention. As illustrated at 702, a first vector normal to the face is projected. At 704, a second vector from the camera to the face is projected. At 706, an angle between the first vector and the second vector is determined. At 708, the face is determined to be visible when the angle between the first vector and the second vector is less than 90 degrees.

FIG. 8 illustrates flow diagram 800 describing the operations to project the vertices of a face to the viewport space, according to one embodiment of the invention. At 802, a view projection matrix is determined. In a view projection matrix, view represents mapping of world space coordinates to camera space coordinates, and projection represents mapping the camera space coordinates to viewport space coordinates. Thereafter, at 804, homogenous coordinates of each vertex of the face is derived. At 806, the view projection matrix and the homogenous coordinates are multiplied.

FIG. 9 illustrates flow diagram 900 describing the operations to determine a geometrical area of projection of a face of a multidimensional object based on the location of a projected vertex of the face, according to one embodiment of the invention. At 902, whether a vertex out of the projected vertices of a face is projected inside or outside the viewport space is determined based on the projection. A viewport space, in one embodiment, is equal to the visible viewport to a user. In another embodiment, however, the viewport space can extend beyond the visible are of the viewport to the user. At 902, a total number of vertices of the face projected inside the viewport space is determined. At 906, when it is determined that a polygon cannot be drawn from the vertices projected inside the viewport space, the area of the polygon is set to zero.

Figure 10:
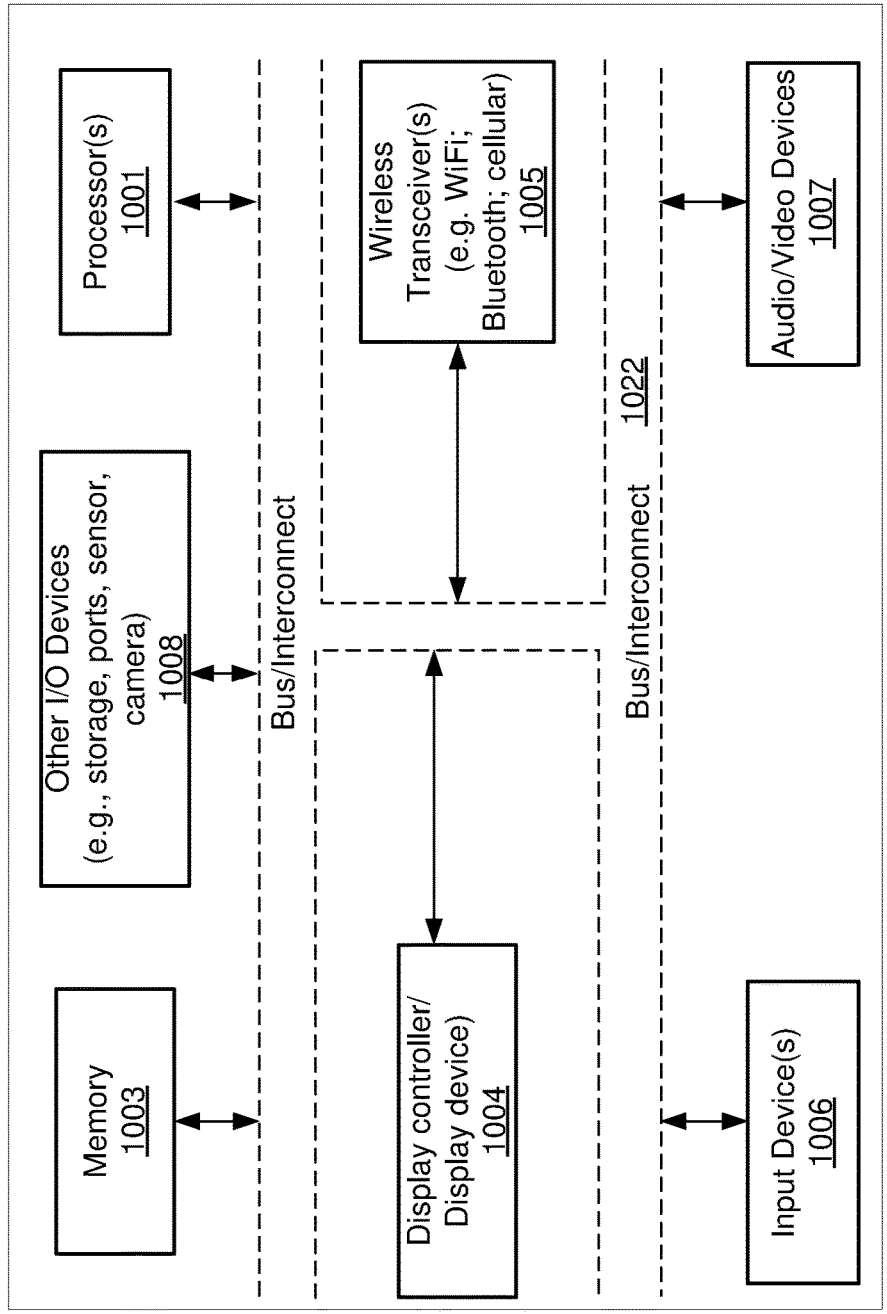
FIG. 10 is a block diagram illustrating a data processing system such as a computing system 1000, according to one embodiment of the invention.

FIG. 10 is a block diagram illustrating a data processing system such as a computing system 1000 which may be used with one embodiment of the invention. For example, system 1000 can be implemented as part of a system to determine viewability metrics of a multidimensional object in a multidimensional environment. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 1000 can represent the server 102. System 1000 can have a distributed architecture having a plurality of nodes coupled through a network, or all of its components may be integrated into a single unit. Computing system 1000 can represent any of the data processing systems described above performing any of the processes or methods described above. In one embodiment, computer system 1000 can be implemented as integrated circuits (ICs), discrete electronic devices, modules adapted to a circuit board such as a motherboard, an add-in card of the computer system, and/or as components that can be incorporated within a chassis/case of any computing device. System 1000 is intended to show a high level view of many components of any data processing unit or computer system. However, it is to be understood that additional or fewer components may be present in certain embodiments and furthermore, different arrangement of the components shown may occur in other embodiments. System 1000 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1000 includes processor 1001, memory 1003, and devices 1005-1008 via a bus or an interconnect 1022. Processor 1001 can represent a single processor or multiple processors with a single processor core or multiple processor cores included therein. Processor 1001 can represent one or more general-purpose processors such as a microprocessor, a central processing unit (CPU), Micro Controller Unit (MCU), etc. Processor 1001 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1001, can also be a low power multi-core processor socket such as an ultra low voltage processor, may act as a main processing unit and central hub for communication with the various components of the system. Such processor can be implemented as a system on chip (SoC).

Processor 1001 is configured to execute instructions for performing the operations and methods discussed herein. System 1000 further includes a graphics interface that communicates with graphics subsystem 1004, which may include a display controller and/or a display device. Processor 1001 can communicate with memory 1003, which in an embodiment can be implemented via multiple memory devices to provide for a given amount of system memory. In various embodiments the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 1003 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1003 may store information including sequences of executable program instructions that are executed by processor 1001, or any other device. System 1000 can further include IO devices such as devices 1005-1008, including wireless transceiver(s) 1005, input device(s) 1006, audio IO device(s) 1007, and other IO devices 1008.

Wireless transceiver 1005 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 1006 can include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). Other optional devices 1008 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1008 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 1022 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, in one embodiment, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to determine a geometric area of projection of a multidimensional object in a multidimensional environment are described herein. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method to determine whether a surface of the multidimensional object is projected on a camera on a viewport space displayed on a graphical user interface, comprising:
projecting a first vector normal to a surface of the multidimensional object, wherein the multidimensional object is rendered in an electronically generated multidimensional environment;
projecting a second vector from the camera to the surface of the multidimensional object;
determining an angle between the first vector and the second vector; and
based on the angle determining whether the surface is projected on the viewport space.

2. The method of claim 1, wherein when the angle between the first vector and the second vector is less than 90 degrees, determining the surface is projected on the viewport space, and wherein when the angle between the first vector and the second vector is exactly 90 degrees, determining only an edge or corner of the surface is projected on the viewport space.

3. The method of claim 1, wherein the angle is determined by a dot product between the first vector and the second vector.

4. The method of claim 1, further comprising determining the projected vertices of each surface.

5. The method of claim 4, wherein determining the projected vertices of each surface includes:
determining a view projection matrix;
determining homogenous coordinates of each vertex of the surface; and
multiplying the view projection matrix with the homogenous coordinates to determine the projected vertices of the surface.

6. The method of claim 5, wherein the view projection matrix is determined from a rending pipeline of a graphics engine, wherein the graphics engine generates the multidimensional environment.

7. The method of claim 6, wherein the view projection matrix relies on at least one of: a position or rotation of the camera rendering the multidimensional environment, field of view, screen aspect ratio, or the far and near clip planes of the camera.

8. A non-transitory computer readable medium comprising instructions which when executed by a processing system having at least one processing core performs a method to determine whether a surface of the multidimensional object is projected on a camera on a viewport space displayed on a graphical user interface, comprising:
projecting a first vector normal to a surface of the multidimensional object, wherein the multidimensional object is rendered in an electronically generated multidimensional environment;
projecting a second vector from the camera to the surface of the multidimensional object;
determining an angle between the first vector and the second vector; and
based on the angle determining whether the surface is projected on the viewport space.

9. The non-transitory computer readable medium of claim 8, wherein when the angle between the first vector and the second vector is less than 90 degrees, determining the surface is projected on the viewport space, and wherein when the angle between the first vector and the second vector is exactly 90 degrees, determining only an edge or corner of the surface is projected on the viewport space.

10. The non-transitory computer readable medium of claim 8, wherein the angle is determined by a dot product between the first vector and the second vector.

11. The non-transitory computer readable medium of claim 8, further comprising determining the projected vertices of each surface.

12. The non-transitory computer readable medium of claim 11, wherein determining the projected vertices of each surface includes:
determining a view projection matrix;
determining homogenous coordinates of each vertex of the surface; and
multiplying the view projection matrix with the homogenous coordinates to determine the projected vertices of the surface.

13. The non-transitory computer readable medium of claim 12, wherein the view projection matrix is determined from a rending pipeline of a graphics engine, wherein the graphics engine generates the multidimensional environment.

14. The non-transitory computer readable medium of claim 13, wherein the view projection matrix relies on at least one of: a position or rotation of the camera rendering the multidimensional environment, field of view, screen aspect ratio, or the far and near clip planes of the camera.

15. A system to determine whether a surface of the multidimensional object is projected on a camera on a viewport space displayed on a graphical user interface, comprising:
a memory device;
a processing system coupled to the memory device, the processing system configured to:
project a first vector normal to a surface of the multidimensional object, wherein the multidimensional object is rendered in an electronically generated multidimensional environment;
project a second vector from the camera to the surface of the multidimensional object;
determine an angle between the first vector and the second vector; and
based on the angle determine whether the surface is projected on the viewport space.

16. The system of claim 15, wherein when the angle between the first vector and the second vector is less than 90 degrees, determining the surface is projected on the viewport space, and wherein when the angle between the first vector and the second vector is exactly 90 degrees, determining only an edge or corner of the surface is projected on the viewport space.

17. The system of claim 15, wherein the angle is determined by a dot product between the first vector and the second vector.

18. The system of claim 15, further comprising determining the projected vertices of each surface.

19. The non-transitory computer readable medium of claim 18, wherein determining the projected vertices of each surface includes:
determining a view projection matrix;
determining homogenous coordinates of each vertex of the surface; and
multiplying the view projection matrix with the homogenous coordinates to determine the projected vertices of the surface.

20. The non-transitory computer readable medium of claim 19, wherein the view projection matrix is determined from a rending pipeline of a graphics engine, wherein the graphics engine generates the multidimensional environment, and wherein the view projection matrix relies on at least one of: a position or rotation of the camera rendering the multidimensional environment, field of view, screen aspect ratio, or the far and near clip planes of the camera.

* * * * *

UNITED STATES PATENT AND TRADEMARK OFFICE
CERTIFICATE OF CORRECTION

PATENT NO. : 11,741,626 B2  
APPLICATION NO. : 17/148800  
DATED : August 29, 2023  
INVENTOR(S) : Bitny et al.

Page 1 of 1

It is certified that error appears in the above-identified patent and that said Letters Patent is hereby corrected as shown below:

In the Specifications

Column 1, Line 12, the phrase "filed on Jan. 30, 3019" should be read as "filed on Jan. 30, 2019"

Signed and Sealed this  
Second Day of January, 2024

Katherine Kelly Vidal  
*Director of the United States Patent and Trademark Office*